Oct. 19, 1971 P. F. PUGH 3,613,231
METHOD FOR MANUFACTURING HIGH VOLTAGE CABLE SYSTEMS
Filed July 25, 1969 3 Sheets-Sheet 1

INVENTOR
PAUL F. PUGH
BY Paul F. Pugh

Oct. 19, 1971     P. F. PUGH     3,613,231
METHOD FOR MANUFACTURING HIGH VOLTAGE CABLE SYSTEMS
Filed July 25, 1969     3 Sheets-Sheet 2

INVENTOR
PAUL F. PUGH
BY Paul F. Pugh

INVENTOR
PAUL F. PUGH
BY Paul F. Pugh

United States Patent Office 3,613,231
Patented Oct. 19, 1971

3,613,231
METHOD FOR MANUFACTURING HIGH
VOLTAGE CABLE SYSTEMS
Paul F. Pugh, 4082 Sequoyah Road,
Oakland, Calif. 94605
Filed July 25, 1969, Ser. No. 844,954
Int. Cl. H01b 13/00; H05k 3/00
U.S. Cl. 29—624                                    15 Claims

ABSTRACT OF THE DISCLOSURE

Preassembled high voltage cable system operated with oil and water circulation incorporating forced cooling permits lower cost underground cable work. A unique method of manufacturing preassembled high voltage cables facilitates ease of forced cooling and monitoring the temperature and quality of high voltage cable. Pressurized fluid aids electrical and mechanical performance of cable during manufacturing, installation, and while in operation. Heat is extracted by a unique method. Ageing of cable is determined by an electronic circuit. Existing overhead bare and insulated lines can be placed directly underground and quickly. Splices and terminations are sealed by fluid pressure. New fluid-filled and pressurized high voltage cables have centering material and extruded polymers on the conductors. Many novel aspects of manufacturing high voltage cables in a box-shaped container which is used for shipping and transporting potheads—factory attached—are presented.

BACKGROUND OF THE INVENTION

This invention relates to the method of operation of a high voltage cable system and a method for manufacturing a cable for the system. More particularly, the invention relates to unique preassembled pressurized, fluid-filled cables to extract heat from the cable and permit additional loading of cable safely. Bending, twisting, mechanical protection, and warning provisions during dig-ins are provided by pressurized fluids. In addition, the invention relates to method patent application #777,415.

The high cost of underground transmission electric power lines has been due largely to high labor costs for installing and limited loading ability. In particular, this invention relates to new methods for manufacturing and controlling the loading of a preassembled high voltage cable system.

A preassembled high voltage cable system with factory attached potheads (application #777,415) has lower installation costs than field assembled systems. Forced cooling of cables has been used for years to increase cable loading. The economical use of same on long lengths has been restricted by pressure limits and particularly on porcelain potheads at ends. Patent application #777,415 disclosed a method for pressure control and cooling of splices and terminations.

To completely and efficiently extract heat from high voltage cables, cooling is necessary at the conductor, over the insulation, and over the sheath. Present methods do not have all three provisions for cooling and are limited on loading and safety. Present heat exchangers used with cables have a definite noise problem. High voltage cables have had limited mechanical, limited bending, and limited twisting capabilities. High voltage splices and terminations with pressurized fluid have been difficult to seal requiring soldered or welded connections. Prevention of cable dig-ins have been attempted by using metallic conduits, concrete encased ducts, concrete slabs, planks, or armoring of cables, all of which are expensive and have limited warning ability.

All of the mentioned problems and limitations of high voltage cables have helped to contribute to the high cost of underground lines. This invention relates to a system which overcomes the mentioned limitations and helps to reduce the costs of underground high voltage lines.

Long flexible lengths of high voltage cables have been manufactured by passing metal conductors through a machine which wraps layers of thin, weak paper tapes uniformly over the conductor to the desired thickness at each voltage. Metal tapes are wrapped next to the conductor and as the final layer of insulation to provide electrostatic shielding which helps prevent corona. The shielding tapes help reduce the amount of paper thickness for a given voltage. The paper insulated conductor is wound on large reels. Reels are placed in tanks and paper tapes are treated with oil by pulling a vacuum and soaking paper with degasified oil. An aluminum sheath is then applied by running the insulated and shielded conductor through a machine which extrudes a continuous aluminum sheath.

An alternate method used has been to pass the dry taped conductor through the aluminum sheath machine first. Impregnation and treating of the paper tapes is done after the aluminum sheath is applied. This is particularly true for hollow core oil-filled high voltage cables.

Cables have been made with pre-treated paper tapes in the same machines. Aluminum sheaths have been applied by pulling the insulated conductors through a tube laid out flat and straight on the floor. The aluminum sheath is then swaged down over the insulation. The conductors and the finished cables are compact and precision made.

Even though present high voltage cables are manufactured efficiently the methods are limited in producing cables with ease of bending, twisting, and sustaining mechanical blows without failure. Machinery and methods for manufacturing high voltage cables have not been established to make forced cooled cables with large hollow cores, loose-fit sheaths, and loose-fit cooling jackets. Short lengths of high voltage cables are expensive to manufacture with machines because of high setup charges. Present high voltage cables are easily damaged unless handled with care and by special means.

Accordingly, new methods for manufacturing high voltage cables utilizes a system whereas cooling spaces are easily provided. Bending, twisting, and mechanical abuse is controlled by fluid pressure and not limited by tight-fitting fragile materials. Components are machine produced for low cost, but can easily and efficiently be assembled for short or long lengths to a particular specification.

SUMMARY OF THIS INVENTION

This invention relates to unique methods for manufacturing, assembling, and operating preassembled high voltage cables (application #777,415) with provisions for cooling easily which will become evident in the application. To completely and efficiently extract heat from high voltage cables fluids must be circulated through the conductor, over the insulation, and over the metallic sheath. This invention includes all methods in one preassembled cable system.

An unique aspect of this invention is a method for manufacturing high voltage cables in a box-shaped container which permits attachment of potheads. Special cable constructions to facilitate cooling, bending, twisting, and mechanical abuse are easily assembled in minimum space and short lengths are economical. The cable is assembled in final shipping container.

Loose-fit aluminum, steel, or flexible sheath fluid pressurized high voltage cables are assembled with conductors 3,613,231 and insulations which are free to move under bends and twists. The conductor may be solid metallic tubes. The insulation is a pressurized fluid with an extruded polymer material or rigid-type material surrounding the conductor to mechanically keep the conductor centered or from making contact with the ground.

Outer loose-fit jackets or sheaths are placed in box-shaped container coiled about inner drum in layers perpendicular to the center drum (application #777,415). The conductor and inner components are then pushed and pulled into center of loose-fit sheath or jacket.

Presently, pipe-type high voltage cables are field assembled by pulling insulated conductors into rigid steel pipe which is pressurized with a fluid. The object of this invention is a method to preassemble these same insulated conductors in flexible tubes for forced cooling with factory attached potheads in the box-shaped shipping container and safely bury in the ground.

To splice and terminate fluid pressurized high voltage cables presented in this invention a unique method for sealing against fluid leakage is presented. The method is easier and faster to install.

A completely new approach for undergrounding overhead lines is presented. The box-shaped container is used to place insulated overhead cables directly underground with pressurized fluid or conducting fluid for shielding. Bare overhead conductors are insulated and placed underground in one operation by a box-shaped container introduced in application #777,415.

A unique heat exchanger which is noiseless and specifically for hot oil-filled cables is part of the system. An electronic circuit for monitoring the conductivity of water or the purity of oil is a part of the system.

The complete objective and purpose of this invention will become evident as the figures are described below. It is to be understood that many ramifications of this invention will be used for manufacturing, installing, and operating a high voltage cable system.

DESCRIPTION OF THE PREFERRED METHOD

Attention is now directed to the drawings in detail and particularly to FIGS. 1-6, there is shown the method by block diagrams for connecting the preassembled cables for forced cooling through the conductor, over the insulation, and over the sheath.

Figure 1:
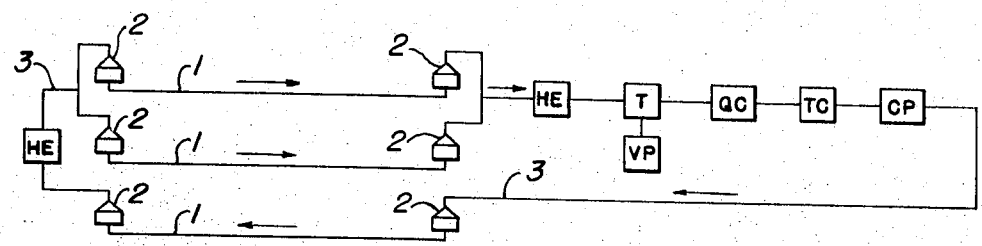
FIG. 1 is a block diagram of preassembled single conductor cable system with heat exchangers (HE), tank of oil (T), vacuum pump (VP), quality control circuit for oil (QC), temperature control for oil (TC), and circulating oil pump (CP). The oil is circulated through preassembled potheads connected to equipment as shown in application #777,415.

In FIG. 1 cable 1 is a single conductor, hollow core, sized to handle the oil volume and the need to dissipate heat from the cable. The insulation is paper-oil, plastic and oil, or other pressurized fluid and solid insulation for centering of conductor in sheath. Sheath is metallic or non-metallic and may have a protective jacket. Potheads 2 are factory assembled to each end with pressurizing cells in base as shown in application #777,415. Potheads 2 are placed in oil and attached to bushings of terminal apparatus (application #777,415) for oil circulation through potheads. Oil is circulated down one cable and back the other two.

Heat exchangers (HE) are placed at each end. Conventional mechanical devices are shown to complete the forced cooling circuits: tank (T); vacuum pump (VP); quality control of fluid (QC) which may be power factor or capacitance measuring device; tempearture control (TC); and circulating oil pump (CP). All devices are typically connected to a central control board for automatically operating the system within preset temperature and quality limits. Connecting pipes 3 pass oil in and out of cables and through mechanical devices as shown in application #777,415. Pressurizing the fluid aids electrical and mechanical properties of cable system.

Figure 2:
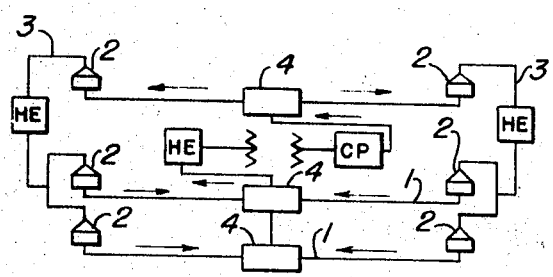
FIG. 2 is the same system for oil circulation and functions as mentioned in FIG. 1 except oil is circulated in and out of splices in addition to potheads.

FIG. 2 has the same cable 1 and potheads 2 and in addition has joints or splices 4 (application #777,415) which permits circulating oil into and out of splices and both directions in cables 1 as a deviation to FIG. 1. Heat exchangers (HE) are placed at joints as well as both ends.

Figure 3:
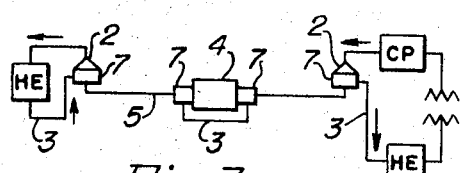
FIG. 3 is for preassembled single conductor cable system with forced cooling. The oil is circulated through the conductor and returned through the empty or open space between the conductor and sheath. This method can be used for single phase or three phase circuits.
Figure 4:
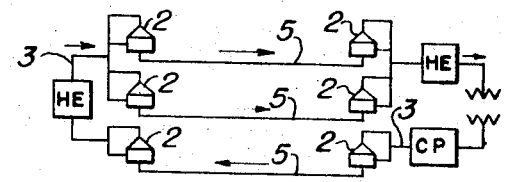
FIG. 4 is for preassembled three single conductor cables with oil circulation through the conductor and over the insulation. Oil circulated over the insulation is removed from base of pothead for circulation.

The cables 5 in FIGS. 3-4 are preassembled cables and potheads with hollow core in the conductor and loose-fit sheath for oil circulation through the conductor and over the insulation. A single conductor, single phase circuit, or one conductor of a three phase electrical circuit, is shown in FIG. 3 with forced cooling whereby oil is circulated down the conductor center and back under loose-fit sheath. At potheads 2 oil enters and leaves the hollow core and enters and leaves fittings at pothead base 7 (application #777,415). At splice 4 oil is removed through fittings at pothead base 7 in joint (application #777,415) and bypass piping 3 to other side of splice 4 to pothead base 7.

Figure 5:
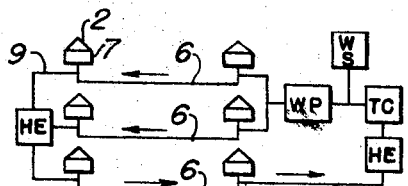
FIG. 5 is for circulating water over the sheath of a preassembled cable for outside or ambient cooling with water pump (WP) and water supply (WS). The water supply automatically keeps the system full of water. The water jacket when pressurized acts to provide mechanical protection during installation and warns intruders of pending trouble by expelling water under pressure.

Cable 6 in FIG. 5 is typically a rubber-like cable preassembled in plastic conduit, for forced cooling, which is loose-fit tube to cool and maintain proper soil temperature. Water enters and leaves through plastic tube 9 and travels through necessary mechanical devices shown to complete the hydraulic circuit such as heat exchanger (HE) and water pump (WP). Water supply (WS) automatically provides water needed due to evaporation or leakage losses.

Figure 6:
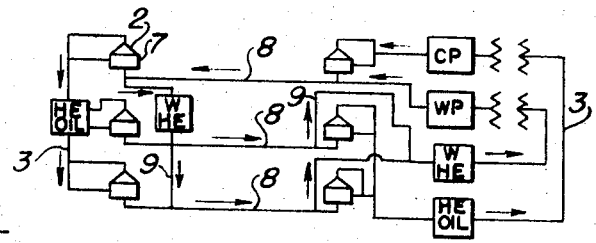
FIG. 6 is for preassembled single conductor cables with oil cooling through the conductor, over the insulation, and water cooling over the sheath.

Cable 8 in FIG. 6 has hollow core for oil circulation, is preassembled with potheads 2, loose-fit sheath for oil circulation over the insulation, and loose-fit plastic conduit or tube for water circulation over the sheath. Circulation, pressure, and mechanical devices are used as described previously. Heat exchangers for oil (HE-OIL) and heat exchangers for water (W-HE) are shown at each end.

FIGS. 7-19 show the deails of preassembled cables in unique box 30 and then provided with preassembled potheads 2. Pressurized oil 10 is circulated through hollow conductor 11 or tubular conductor 28, over paper insulation 12 and shielding 13, or over insulations 12, 17, 29'. Pressurized water 29 is circulated over sheath 14 in loose-fit jacket 15.

Figure 9:
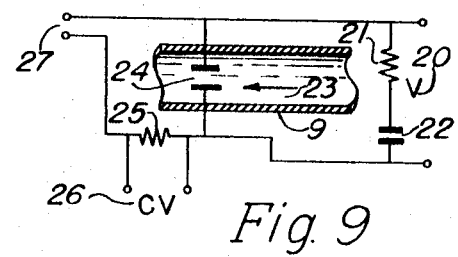
FIG. 9 is a circuit for monitoring the conductivity of the conducting liquid used in FIG. 8. The resistance or capacitance of the liquid is monitored to effect proper insulation shielding.
Figure 19:
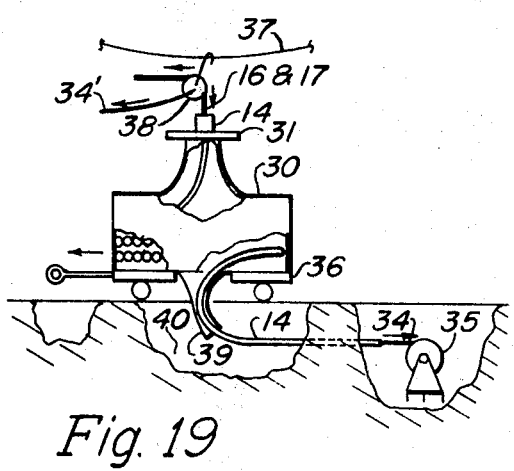
FIG. 19 is the method for removing overhead spacer conductors and placing them underground continuously in a sheath which is then pressurized with a fluid. Both bare conductors and insulated conductors are presently overhead which can be put underground by this method.

Pressurized conducting water or liquid 23 is circulated over rubber-like insulation 17 and stranded conductor 16 which is either new machine made or removed from existing overhead spacer cable shown in FIG. 19, to provide insulation shielding, mechanical protection, and forced cooling. FIG. 9 is the monitoring circuit to maintain proper liquid 23 conductivity as liquid 23 passes plate 24 which has a voltage from power supply 20 and is stabilized by resistor 12 and condenser 22. Voltage 26 is compared with voltage on plates 24 and is of opposite polarity. Normally, output voltage 27 is zero. If the resistance or capacitance of liquid 23 passing through plates 24 loses conductivity or changes in capacitance a voltage develops at 27 which produces a signal indicating fluid needs attention. Automatically, the liquid 23 is restored to proper conductivity.

Figure 10:
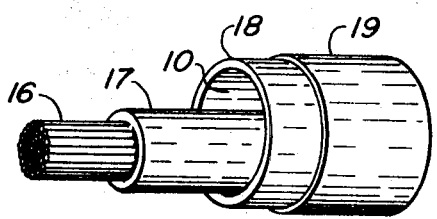
FIG. 10 is a preassembled polymeric insulated and oil pressurized cable in a loose-fit aluminum sheath with a protective jacket. The parts are manufactured by machines and then assembled in the box-shaped container.

In FIG. 10 a stranded conductor 16 with rubber-like insulation 17 is surrounded by pressurized oil 10 in aluminum sheath 18 with a protective jacket 19.

Figure 11:
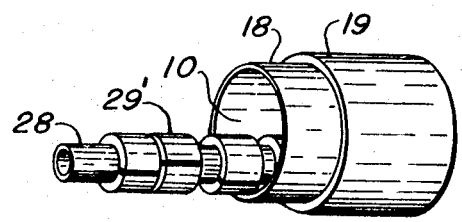
FIG. 11 is an aluminum or metallic tube for conductor which is pushed and pulled into an aluminum sheath while insulation is placed on the conductor by snapping on rings or tubes.

In FIG. 11 an aluminum tubular conductor 28 is surrounded by split snap-on centering insulation 29', surrounded by pressurized oil 10, and loose-fit aluminum sheath 18 with protective jacket 19.

Figure 14:
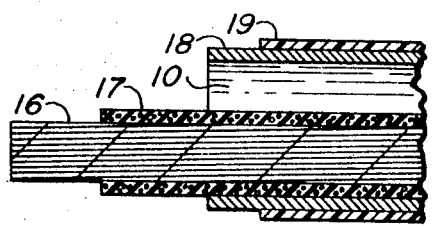
FIG. 14 is the cross section of hollow core insulated conductor in a loose-fit metallic tube with a protective jacket.

FIG. 14 is a cross section of FIG. 10.

Figure 15:
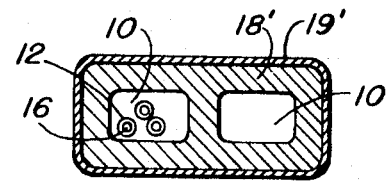
FIG. 15 is a flat cable for placing in roadway or hollow space with provision for forced cooling by return circuit through empty space. Three insulated conductors are placed in one compartment. Oil or fluid is circulated down one side and back the other. The mass produced components are assembled in shipping container with potheads.

FIG. 15 has two compartments surrounded by aluminum sheath 18' with a protective jacket 19'. Pressurized oil 10 is circulated in a loop through both compartments. In one compartment are three stranded conductors 16 with paper insulation 12.

Figure 16:
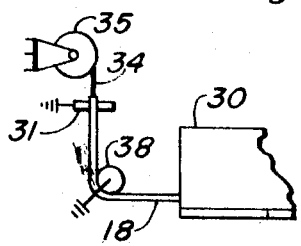
FIG. 16 is variation of FIGS. 17-18 with tube or sheath filled with a liquid to produce a floating action which aids push and pull action for assembly of cable components in box.
Figure 17:
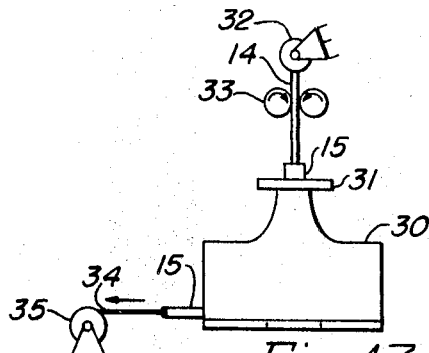
FIG. 17 is the assembly of sheath and insulated conductor by the push and pull method in the shipping container. The sheath was placed in the box first. A nylon rope is blown through the sheath and attached to the conductor which is pushed at top and pulled at bottom to assemble conductor and sheath. Potheads are then attached and placed in container. Complete assembly is treated and filled with oil.

To preassemble cables shown in FIGS. 7-15 in box 30 a tube 15, in FIG. 17, is placed in box uniformly in layers (application #777,415) with ends free at top and bottom which is anchored by collar 31. A nylon pulling rope 34 is pulled from reel 35 and blown through tube by compression or pulled with string previously blown or fished through tube. Reel 32 with sheath 14 or cables 12, 13, 17 are pushed by pusher 33 and pulled by reel 35 both of which are power driven. When tube 14 or cables 12, 13, 17 emerges at bottom outside end of tube 15, a cut is made at top to remove excess tube 14 or cables 12, 13, 17. Proper lubrication and tension control devices are used. The tubes may be filled with a fluid to produce a floating action which aids installation on long lengths. FIG. 16 shows the method for floating and will be presented later. Potheads 2 (application #777,415) are then attached and placed in top and bottom of box 30. Cable and potheads are then vacuum treated, filled with oil or fluid, and pressurized. Cable and potheads are tested. Then box 30 is sealed and shipped to job site for installation in open trench or by plow-in (application #777,415).

Figure 18:
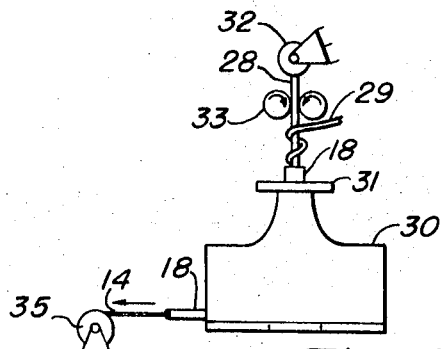
FIG. 18 is the assembly of sheath, bare conductor, and insulation in shipping container. The insulation is spirally applied, split and snapped on, clamped on, or pushed over conductor from end. Potheads are attached. System is treated and filled with oil, tested, and ready for installation.

In FIG. 18 the same operations as FIG. 17 are followed except a bare conductor or tube of aluminum 28, copper, steel, or conducting metal is pushed and pulled into sheath 18 in box 30. Preformed insulation 29' is attached to conductor 28 at the same time. Preformed insulation 29' may be paper, plastic, foam plastic, or flexible synthetic or natural electrical insulating material which can be snapped around or spiralled around conductor 28 as it enters sheath 18.

Figure 12:
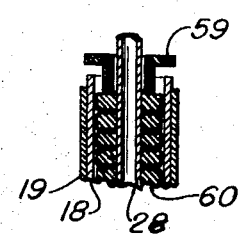
FIG. 12 is a cross section of cable made by pushing the insulation or centering materials over the conductor after the conductor has been threaded through the sheath.
Figure 13:
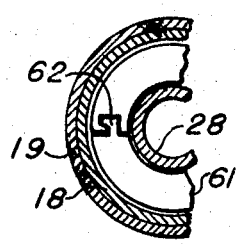
FIG. 13 is the cross section of cable referred to in FIG. 11 except the insulation is applied to the conductor by interlocking halves of rings or tubes.
Figure 7:
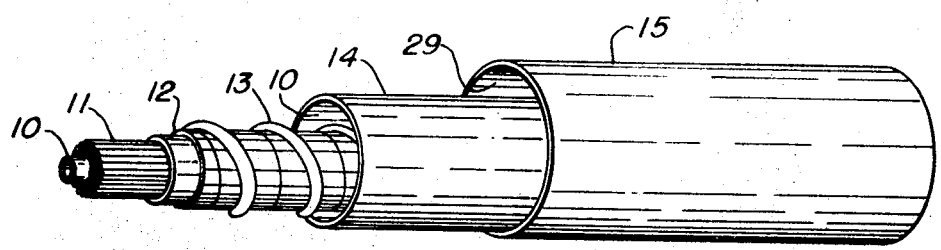
FIG. 7 is a preassembled hollow core, aluminum conductor, paper insulated cable, in loose-fit sheath, and loose-fit cooling jacket assembled in a box container.

FIG. 13 shows insulation 61 which may be rigid, organic, inorganic, or ceramic, and is applied split with an interlock 62. FIG. 12 shows insulation 60, of previously mentioned materials, which may be tubular or rings and which are installed over conductor 28 by slipping over end of conductor 28. Pusher 59, and/or fluid pressure are used to produce forward motion of insulation 60 over conductor 28 and through sheath 18. On long lengths sheath 18 may be filled with liquid to provide floating action as shown in FIG. 16. Potheads 2 are attached at top and bottom. Cable and potheads are vacuum treated, filled with oil or fluid, and pressurized. Cable and potheads are tested. Box 30 is sealed and installation is made as above.

FIG. 16 is an alternate method for feeding sheath 14 or conductor 28 through tube 15 or sheath 18 as shown in FIGS. 17-18. Sheath 18 is pulled from box 30 around sheave 38 to anchoring collar 31 located at height slightly above top of box 30. Pulling rope 34 is attached to power winch and conductor 28 as before. Sheath is filled with a liquid below collar 31'. The liquid acts as a lubricant and floats a hollow sealed sheath 14 or conductor 28 and aids pushing and pulling long lengths with minimum damage to components.

Figure 8:
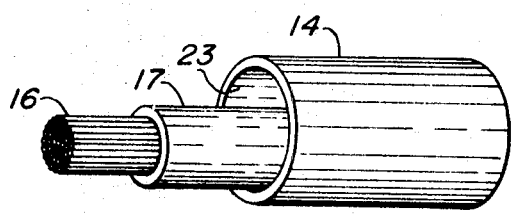
FIG. 8 is a preassembled aluminum conductor cable with extruded insulation on the conductor, conducting liquid, and polymeric tube for low cost primary cable and for converting insulated overhead cables to underground.

To convert existing overhead cables to underground refer to FIG. 19. A box 30 is transported on truck 36 under or along side aerial spacer cable 16, 17. The insulated spacer cable 16, 17 is fed into sheath 14 which was previously installed in box 30 and anchored by collar 31. Pulling reel 35 with pulling rope 34 attached to cable 16 and 17 is mounted in hole in ground or above ground at terminal and sheath 14 is laid in open trench 40 by feed tube 39 and backfilled or plowed-in ground directly as truck moves forward. Steel messenger 37 is strung or is part of aerial spacer cable system. Sheave 38 rides on messenger 37 and is pulled forward by rope 34' at same rate as truck 36. Spacers are removed ahead of this operation. Power pushers may be used at entrance to sheath 14. At the end of overhead line, cables 16, 17 are installed and buried in sheath 14. Potheads are installed. The tube is filled with conducting liquid 23 as shown in FIGS. 8–9. Cable is pressurized and forced cooled as needed as described previously. Cable loading can be the same as overhead by forced cooling. Or, if sheath is metallic as shown in FIG. 10, cable receives potheads, is vacuum treated, oil or fluid-filled, pressurized, and equipped with necessary mechanical devices shown in FIGS. 1–6. Sheath 18' in FIG. 15 may be used for field undergrounding of aerial lines or cables to handle three conductors under one sheath. Configuration in FIG. 7 may be used to circulate oil 10 and water 29 for conversion of overhead to underground cables. A jacket 15 and water 29 may be used under pressure to warn of mechanical damage such as kinking or compression, and will serve to protect cable after installation against dig-ins. The pressurized fluid acts to protect cable and to warn pople digging in area that electric cable is present.

Figure 20:
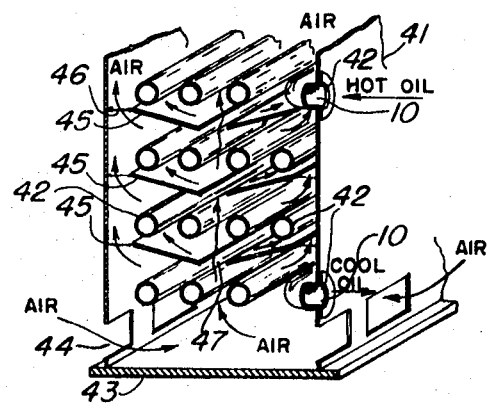
FIG. 20 is a natural convention and radiation heat exchanger, oil to air, based on spacing of pipes, baffles, and high temperature oil. Small units are spaced on cable route at splices and terminations. The units are noiseless and require no power. Air turbulence is aided by pipe spacing.
Figure 21:
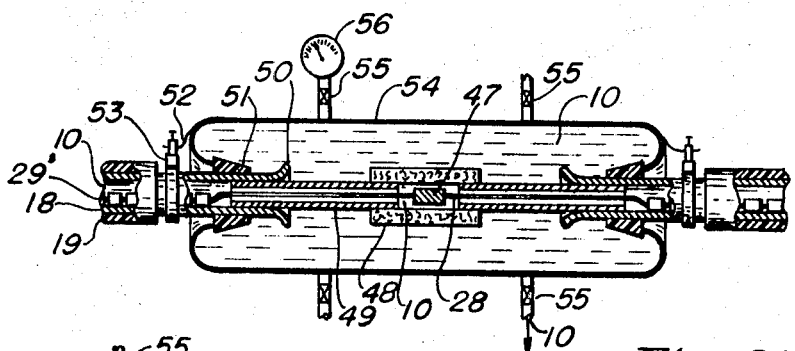
FIG. 21 is a splice for preassembled cables in FIGS. 12-13, however, splices can be used for any pressurized cable. The pressure maintains the seal to prevent fluid leakage by compressing a soft oil resistant polymer sealing material against the cable sheath. The higher the pressure the greater the sealing action. The splice is fast and easy to apply. It is easy to remove.
Figure 22:
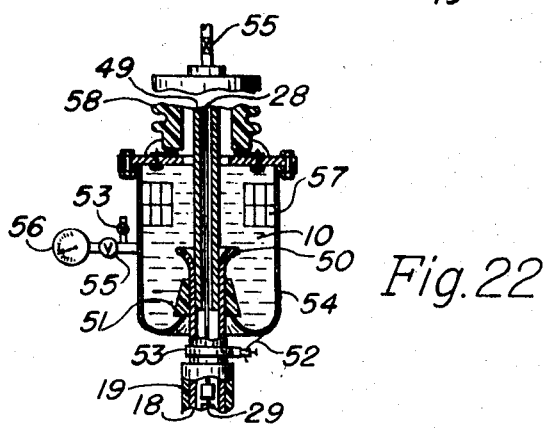
FIG. 22 is a pothead wih the same sealing method as FIG. 21. To make splices and terminations long insulating tubes are slipped over the bare condutcor and back under metallic sheath. The pothead sealing method permits fast installation and removal. Potheads can be reused for factory testing of all types of cables at high voltages and can be used to provide corona-free potheads by pressurizing the fluid.

FIGS. 20–22 complete the new pressurized high voltage cable system with factory attached potheads and provisions for forced cooling.

A small capacity heat exchanger of a new design for cooling electric power cables is shown in FIG. 20. Hot cable oil 10 leaves cable splice or termination and enters metallic pipe 42, which is shown cutaway at top and bottom, which may have internal fins for large pipes to get heat by conduction from center of stream to pipe 42 surface, then to air by convection and radiation. For small diameter pipes external fins may be used to help dissipate heat. The pipe 42 is formed in horizontal and vertical layers in such a way that hot oil 10 enters at top and leaves at bottom as cool oil 10. Layers of pipe 42 are separated by baffles 45 which deflect warm air to sides and up empty space 46 on opposite sides producing a chimney effect. Cool air 44 is pulled in at bottom, is warmed, and forced to side of chimney 46. Opening 47 at center of baffles permits air 44 to enter all layers and flow over pipes 42. Baffles 45 are insulating and poor radiators of heat. The unit in FIG. 20 has four panel sides 41, open bottom 44, and base 43 for support. The top is open. Screens may be used over openings to prevent entry of animals, rodents, insects, or people. Pipe 42 is sized to meet pressure drop requirements and heat dissipating needs. Pipe 42 is spaced exactly a pipe 42 diameter which turns natural convection into forced convection by turbulent effect caused by the interaction of convection streams of each pipe 42. The length of pipe is selected to dissipate the necessary heat and to maintain the required exit cool oil 10 temperature. Heat is dissipated by conduction, natural convection, and radiation. No fan power, moving external parts, or noise is present. However, fans may be powered by hydraulic motors driven by cable oil flow or by electric motors driven by load current of electric cables. Both are variable speed fans driven in relation to cooling needs and would be used for larger capacity heat exchangers with the sacrifice of having moving parts and noise. The cooling unit in FIG. 20 may be operated in air or submerged in a large body of water. Water may be sprayed on pipes 42 for extra cooling. Heat dissipation is closely related to hot oil 10 temperature which is determined by cable electrical loading. An increased cable loading or current carrying capacity produces a higher hot oil 10 temperature which in turn produces greater heat loss in cooling unit. The cooling unit tends to be self-regulating and permits cable overloading safely.

FIGS. 21–22 are splices and terminations for factory assembled cables and potheads to permit fast installation for factory testing of cables and for lower cost field splices and terminations for field repair or maintenance. To field splice the cable is frozen on ends of splice or damaged point to stop oil flow. After installing splice, oil is then flushed from each side into joint and out through fittings 55. Gage 56 may be attached to measure oil 10 pressure. Cable is shown in FIG. 11. Sheath 18 is belled, or flared, and smoothed as at end 50. Insulating sleeve 49 is placed over conductor 28 at each end under sheath 18. Connector 47 joins hollow conductor 28 and maintains hollow core through connector 47 and permits flow of oil into joint through porous or perforated insulating tubing 48 which is positioned over connector 47. Metallic sleeve 54 with end seals 51 is positioned as shown. High pressure oil 10 compresses seals 51 against metallic sheath 18 preventing oil leakage. Sleeve 54 can be removed and reused by reducing pressure by valves 55. Corona or ionization is prevented at conductor 28 and sheath end 50 by smooth surfaces and a high pressure oil 10. Ground wire 52 connects metallic sleeve 54 to cable sheath 18 by concentric ground clamps 53 at each end of splice. Metal sleeve 54 acts as ground and shield. Internal oil 10 pressure acts to prevent mechanical damage and compression of sleeve 54.

Pothead in FIG. 22 can be reused for corona testing as described for FIG. 21. Pothead has cells 57 in base (application #777,415) for oil-filled cable. Porcelain or epoxy bushings 58 are submerged in oil at equipment termination (application #777,415).

Pothead in FIG. 22 can be reused for corona testing of rubber high voltage cables by using compressed gas in place of oil. Cells 57 and oil submerged bushings would be left out for low cost, reusable, and fast to apply and to remove, high voltage factory test potheads for high voltage rubber cables.

The new methods of assembly shown for the new system of insulated cables relates to manufacturing of cables, pressurizing of fluid, forced cooling of cables, heat dissipation of cables, splicing of cables, terminating of cables, testing of cables and potheads, and converting of overhead lines to underground cables.

There are many types of cables revealed in this application; however, it is within the contemplated scope of this invention that numerous changes and variations can be made in the embodiments and techniques disclosed herein without departing from the intended scope of this invention. Pressurized fluids: liquids, gases, or cryogenic fluids; insulations: natural or synthetic; conductors: natural, synthetic, or super cooled; sheaths: natural or synthetic; and fluid-filled pressurized cooling jackets: natural or synthetic will change as costs change and new developments are accepted.

I claim:

1. A method for manufacturing a flexible pressurized fluid-filled insulated cable in a container having side walls, a bottom wall, and a cover, a drum within said container and around which said cable is wound, and space within said container for installing potheads at each end, comprising the steps of:

(a) coiling a plastic tube in said container in multilayer convolutions with exposed first and second ends;

(b) threading a pulling line in said tube;

(c) connecting one end of line to an end of a length of aluminum sheath with protective jacket, stainless steel sheath, reinforced plastic sheath, or a high hoop stress flexible sheath loose-fit and smaller than said plastic tube;

(d) pulling the other end of said line from said second end of said loose-fit tube while feeding said sheath into first end of said loose-fit tube to thread said loose-fit sheath through said tube with a combined push and pull action; and (e) At first end of loose-fit sheath inserting a loose-fit insulating material and tubular or hollow core conductor simultaneously while feeding into loose-fit sheath with a combined push and pull action.

2. A method according to claim 1 which further includes the steps of:

(a) filling outer tube with a water with second said exposed end elevated above said container before threading loose-fit sheath through said water-filled tube;

(b) sealing ends of said loose-fit sheath;

(c) threading loose-fit sheath through said water-filled tube;

(d) filling said loose-fit sheath with oil or liquid; and (e) threading loose-fit hollow core or tubular conductor while applying centering and loose-fit insulating materials through said liquid-filled sheath.

3. A method according to claim 1 wherein said step of applying a centering electrical insulating material loose-fit in pressurized fluid of electrical insulating characteristics.

4. A method according to claim 1 which further includes the step of purifying the atmosphere within the loose-fit annulus between said loose-fit sheath and conductor with ends of said cable sealed with potheads in said shipping container.

5. A method according to claim 4 wherein said step of introducing an electrically insulating fluid into said sheath with ends sealed with potheads in said shipping container and while maintaining said fluid pressure above atmospheric pressure.

6. A method according to claim 1 which further includes the steps of pressurizing of outer cooling jacket which may be collapsible, structurally self-supporting, or high strength flexible leak-proof material with a high fluid pressure to be maintained when cable is installed and operated;

cable sheath which may be collapsible, structurally self-supporting, or high strength flexible leak-proof material with a high pressure electrical insulating fluid to be maintained when cable is tested electrically, installed, and operated as an electric cable.

7. A method according to claim 1 for making, installing, and operating electrically insulated cables to prevent kinking, to prevent damage during bending and twisting, to prevent collapsing under impact or external pressure or compressive forces, to provide resilience, and to prevent crushing action against digging equipment whereas an outer loose-fit circumferential and longitudinal structural material surrounding cable sheath is filled with fluid and pressurized positively to proper pressure for the intended purpose to prevent mechanical abuse to cable and cable sheath which is structurally sound.

8. A method according to claim 1 for making, installing, and operating electrically insulated cables to prevent damage to internal cable and to warn people or things of the presence of electric cables, whereby an outer loose-fit circumferential and longitudinal structural material surrounding cable sheath is filled with a fluid and pressurized positively so that fluid will be ejected to warn intruder, digger and company owning cable that a dig-in has been made.

9. A method according to claim 1 whereby a machine manufactured insulated rubber-like cable with solid, foam, or reinforced plastic insulation;

metallic shield and jacketed or non-shielded is drawn into said first loose-fit plastic tube;

sealed at ends, filled with pressurized fluid for shipment and installation, and filled with pressurized fluid after installation for forced cooling.

10. A method according to claim 9 whereby non-shielded machine manufactured polymeric insulated conductors are threaded through said first loose-fit outer plastic tube;

filled and maintained with a conducting fluid by a detection circuit to provide insulation shielding;

said first loose-fit outer sheath is metallic and serves as insulation shield and is filled with an electrical insulating fluid and pressurized.

11. A method according to claim 1 whereby outer loose-fit sheath has more than one compartment wherein;

one or more insulated electric conductors are in one compartment;

a fluid is circulated through two compartments to form a loop for forced cooling.

12. A method according to claim 1 whereby a machine manufactured paper-insulated, shielded, and armored pipe-type insulated conductor is threaded through a loose-fit sheath, metallic or non-metallic, to form a preassembled pressurized high voltage cable system.

13. A method according to claim 1 whereby centering insulation is applied by pushing, floating, and pulling concentric electric insulating rings or tubes over said hollow core or tubular conductor which has been threaded through said loose-fit sheath.

14. A method according to claim 1 whereby space is provided for circulating a fluid;

through the conductor, over the insulation, and over the sheath.

15. A method according to claim 1 for manufacturing a high voltage cable system whereby;

conductor is free to rotate or twist, sheath is free to rotate or twist, and insulation is free to rotate or twist.

References Cited

UNITED STATES PATENTS

| | | | |
|---|---|---|---|
| 2,047,000 | 7/1936 | Calvert | 174—15 |
| 2,156,934 | 5/1939 | Barrett | 29—624 |
| 2,645,590 | 7/1953 | Mildner | 29—624 |
| 2,647,224 | 7/1953 | Bruck | 29—624 |
| 3,504,592 | 4/1970 | Damm | 29—624 |
| 3,512,252 | 5/1970 | Sargent | 29—624 |

JOHN F. CAMPBELL, Primary Examiner

D. P. ROONEY, Assistant Examiner

U.S. Cl. X.R.

174—12.3, 8, 15; 242—3; 277—29